United States Patent
Kavasseri et al.

(10) Patent No.: US 7,171,462 B1
(45) Date of Patent: Jan. 30, 2007

(54) CONTEXT-SENSITIVE INTELLIGENT DIFFS OF ROUTER CONFIGURATIONS

(75) Inventors: Ramanathan Kavasseri, Fremont, CA (US); Sankha Basu, Calcutta (IN); Praveen Joshi, Sunnyvale, CA (US); Shankar Natarajan, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 781 days.

(21) Appl. No.: 10/322,852

(22) Filed: Dec. 18, 2002

(51) Int. Cl.
*G06F 15/173* (2006.01)
*G06F 15/177* (2006.01)
*G06F 15/00* (2006.01)

(52) U.S. Cl. .................. 709/223; 709/220; 715/511
(58) Field of Classification Search .............. None
See application file for complete search history.

(56) References Cited

U.S. PATENT DOCUMENTS 6,848,078 B1 * 1/2005 Birsan et al. ............... 715/511
2003/0115299 A1 * 6/2003 Froyd et al. ................ 709/220
2003/0149756 A1 * 8/2003 Grieve et al. ............... 709/223

OTHER PUBLICATIONS

Malis et al., "Multiprotocol Interconnect on X.25 and ISDN in the Packet Mode," RFC: 1356, 18 Pages, 1992.

* cited by examiner

*Primary Examiner*—Wen-Tai Lin
(74) *Attorney, Agent, or Firm*—Beyer Weaver & Thomas, LLP

(57) ABSTRACT

Methods and devices are disclosed for determining differences in the configuration states of network devices. Context-sensitive diffs are produced by comparing two configuration files of a network device. According to some aspects of the invention, the context of each command is preserved in a "programmatic" format that is usable by a network element such as a router. In some aspects of the invention, only commands at a corresponding hierarchical level of the configuration files are compared when producing a diff, in order to increase accuracy and efficiency.

32 Claims, 14 Drawing Sheets

CONTEXT-SENSITIVE INTELLIGENT DIFFS OF ROUTER CONFIGURATIONS

BACKGROUND OF THE INVENTION

1. Field of the Invention

The present invention generally relates to data networks. More specifically, the invention relates to differences in configuration states of routers, switches and other network devices in such data networks.

2. Description of Related Art

For devices such as routers and switches, a configuration state may be represented as a text file known as a "configuration file." Configuration files may reflect the various hierarchical contexts, such as "modes," "submodes," etc., that a router or switch can present. Each context has a specific set of pre-defined commands. Defined commands are valid only within the appropriate hierarchical context, e.g., within a particular mode or submode. Accordingly, such commands are context-specific.

For example, in software developed by Cisco Systems, Inc., there are two top-level modes for routers: "Exec" mode and "Config" mode. Within the configuration mode, there are several defined submodes, which may include sub-submodes, sub-sub-submodes, and so on. For the sake of brevity, all such hierarchical contexts will be referred to herein as "submodes."

Within each submode there are a number of different commands. Commands within Exec mode are not part of the configuration state of a router. Exemplary commands within Exec mode include "show," "copy" and "debug." Commands in Config mode constitute the configuration state of a router. Examples include commands to set up in access lists, hostname, interfaces, etc.

Centralized network management involves configuring, provisioning and managing network elements. A central management application or operator gathers data from network elements in order to derive information to perform these tasks and then downloads configuration commands to one or many network elements to dynamically control the network. Control of the network involves sending one or more commands to network elements. For each command within a set of commands, it is essential that the associated mode or submode be specified so that the command can be applied in the right context. The optimal way of applying a set of configuration changes is by only applying an incremental set of changes, the incremental set being determined for a defined control or measurement interval. Because optimal application is critical in device configuration, it is important to determine the changes or "diffs" between a device's configuration state over a control or measurement interval, e.g. at a first time and at a second time.

With standard and widely used general-purpose diff algorithms, a purely textual diff is generated when two configuration states are compared. Textual diffs have limited utility because the context in which a certain command applies is not carried over. For instance, suppose that the textual diff between two router configurations is "+ ip address 1.1.1.1 255.255.255.0." If the router has 5 different interfaces, the association of this ip address command with a particular interface is unclear. The only "context" provided by such general-purpose algorithms is optionally to include a specific number of lines above and/or below the textual diff. Because submodes have varying and unpredictable numbers of commands, the resulting textual diff may or may not include the proper submode for the changed, new or missing command. In addition, such algorithms may result in inclusion of lines that have not changed.

The ambiguity of such general-purpose textual diffs does not permit accurate application of commands for controlling a network. Moreover, purely textual diffs are not "programmatic," in that they cannot be used as a direct input for a machine-level interface without a need to re-parse generated text. Therefore, conventional textual diffs cannot be reliably used as input to an automated process such as a computer program for automatically changing the configuration state of a network device.

SUMMARY OF THE INVENTION

Methods and devices are disclosed for providing context-sensitive diffs that are produced by comparing two configuration files. According to some aspects of the invention, the context of each command is preserved in a "programmatic" format that is usable as direct input by a network device such as a router, a switch or a host computer. In some aspects of the invention, only commands at corresponding hierarchical levels of two configuration files are compared when producing a diff, in order to increase accuracy and efficiency.

According to some aspects of the invention, a method is provided for comparing a first configuration file having first commands and a second configuration file having second commands. The method includes the steps of determining first hierarchical levels of first commands in the first configuration file; searching only second hierarchical levels in the second configuration file for second commands that match the first commands, wherein the second hierarchical levels correspond to the first hierarchical levels; saving a first missing command for which no match is found in the searching step; and saving context information for the first missing command.

Some aspects of the method include the step of identifying a first re-ordered command that matches a second command, wherein the first re-ordered command has a first position in the first configuration file, wherein the second command has a second position in the second configuration file, and wherein the first position is different from the second position. Some such aspects include the steps of determining whether the first re-ordered command is order-sensitive, and, if the first re-ordered command is order-sensitive, storing the first re-ordered command.

The determining step may include the step of determining a number of spaces preceding a first command. The first configuration file may be a startup configuration file or a running configuration file. The searching step may include the step of determining a number of spaces preceding a second command. The searching step may include the step of beginning a search after a position of a second command that matched a first command. The context information may include a command at a higher hierarchical level than the first missing command.

Some aspects of the method also include the steps of determining second hierarchical levels of second commands in the second configuration file; searching only first hierarchical levels in the first configuration file for first commands that match the second commands, wherein the first hierarchical levels correspond to the second hierarchical levels; saving a second missing command for which no match is found in the searching step; and saving context information for the second missing command.

According to still other embodiments of the invention, a computer program is provided that controls a computer to perform some or all of the foregoing steps.

Some aspects of the invention provide a computer-implemented method for comparing a first configuration file to a second configuration file, each configuration file representing a configuration of a network device and comprising a plurality of commands in a hierarchy characterized by a plurality of submode levels, the method comprising comparing each command in the first configuration file with a subset of the commands in the second configuration file which simultaneously tracking a hierarchical context for the command in the first configuration file, the hierarchical context being based upon a command's submode level in the hierarchy, wherein the subset of the commands in the second configuration file to which the command in the first configuration file is compared is determined with reference to the hierarchical context.

Various embodiments of the present invention provide an apparatus, such as a network device, a personal computer, etc., configured to perform some or all of the foregoing steps.

DETAILED DESCRIPTION OF SPECIFIC EMBODIMENTS

Figure 1:
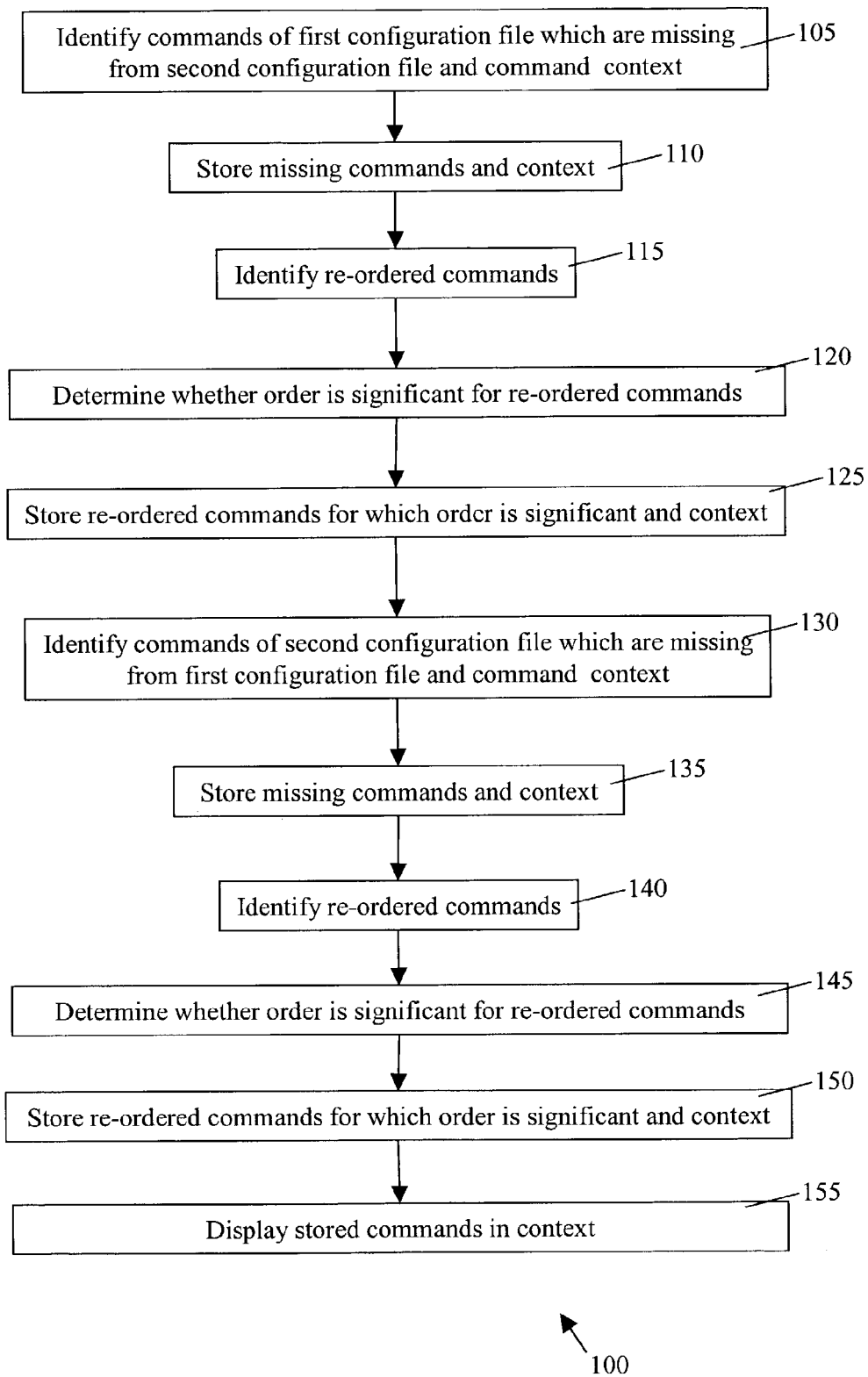
FIG. 1 is a flow chart that outlines some general aspects of the invention.

FIG. 1 is a flow chart that outlines some high-level aspects of method 100 according to the present invention. The steps of method 100 will be described in a particular sequence, but need not be performed in that sequence.

In step 105, commands of a first configuration file are compared to commands of a second configuration file. Commands of the first configuration file that are not present in the second configuration file are identified. The context of these commands is also identified. Generally speaking, "context" means the position of the command within a hierarchy (e.g., the command's submode level) and/or the command's association with other commands. According to some aspects of method 100, the context of a command is identified by indicating all higher-level submode names including the same submode name within which the command is located.

In step 110, missing commands are stored, along with their context information. In step 115, "re-ordered" commands are identified that exist in both the first configuration file and the second configuration file, but which are in a different position in the second configuration file. Some commands, such as access control commands, boot commands, etc., are "order-sensitive," meaning that the commands will produce different results if they are performed in different sequences. Accordingly, in step 120, a determination is made as to whether the re-ordered commands (if any) are order-sensitive. Commands that are both re-ordered and order-sensitive are stored in step 125.

Steps 130 through 150 are mirror images of steps 105 through 125. In step 130, commands of the second configuration file are compared to commands of the first configuration file. Commands of the second configuration file that are not present in the first configuration file are identified. The context of these commands is also identified. In step 135, missing commands are stored, along with their context information.

In step 140, "re-ordered" commands are identified that exist in both the second configuration file and the first configuration file, but which are in a different position in the first configuration file as compared to the second configuration file. In step 145, a determination is made as to whether the re-ordered commands (if any) are order-sensitive. Commands that are both re-ordered and order-sensitive are stored in step 150. In optional step 155, stored commands are displayed in context. Alternatively, the stored commands are provided to software or hardware that will make use of these data, which are known herein as intelligent configuration diffs or ICDs, preferably without the need for human intervention.

Figure 2:
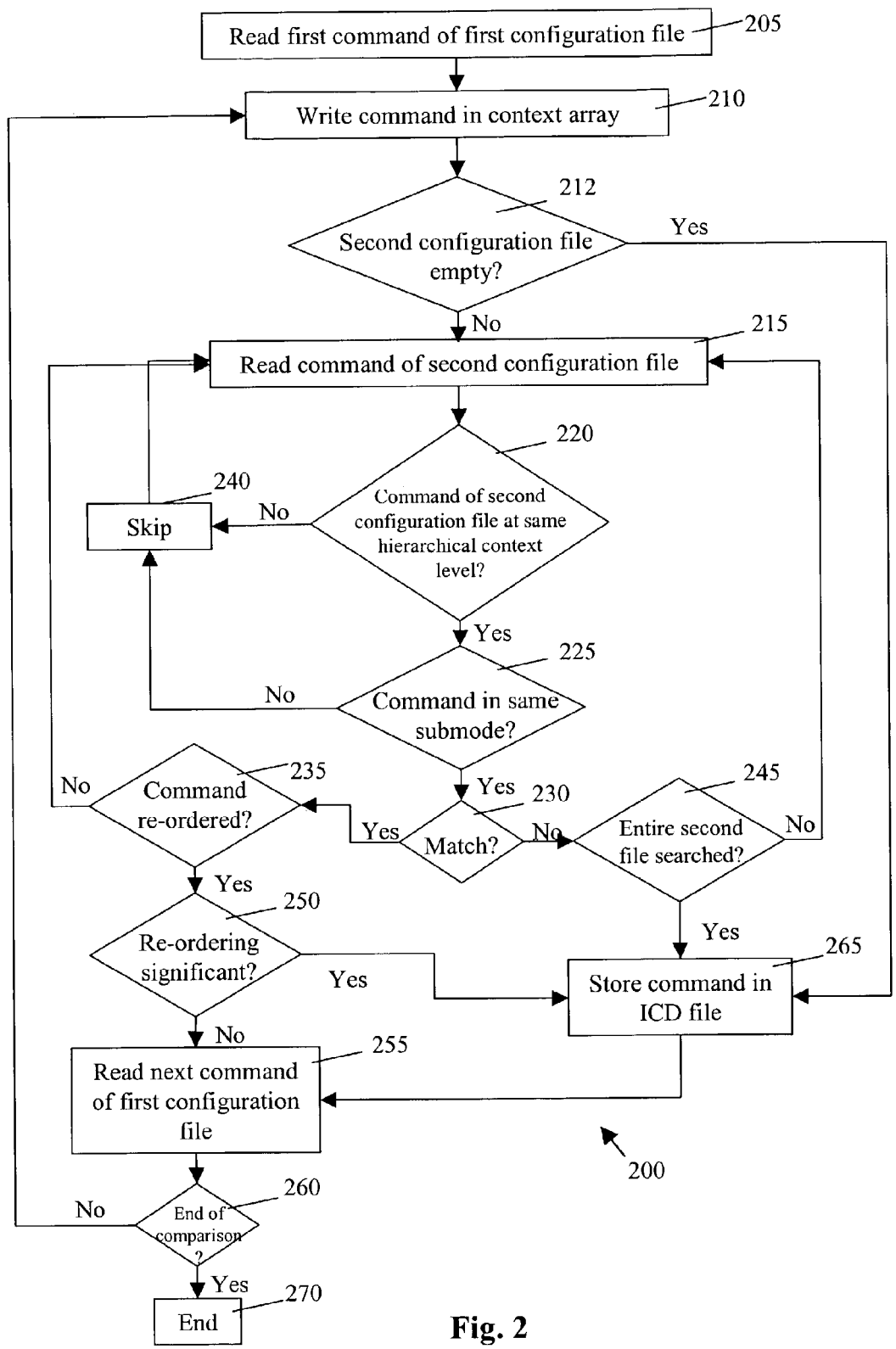
FIG. 2 is a flow chart that outlines a process of comparing a first configuration file to a second configuration file.

FIG. 2 is a flow chart that depicts the steps of method 200 according to some aspects of this invention. The steps of method 200 provide more detail regarding steps 105 through 125 according to some aspects of method 100. Once again, the steps of method 200 may be performed in an order different from that depicted in FIG. 2 and described below. Moreover, some steps described below may be omitted and/or other steps may be added.

In step 205, a first command of a first configuration file is read. Preferably, the hierarchical modality (e.g., the submode level) of the first command is determined. The configuration file could be, for example, a running configuration file of a network device. In step 210, the first command is written to a file, which is referred to as a "context array" in this example. More details about the context array will be explained below with reference to FIG. 3.

In step 212, it is determined whether a second configuration file has commands or whether the second configuration file is empty. If the second configuration file is empty, the process continues to step 265, wherein the command from the first configuration file is stored in a file. If the second configuration file is not empty, the process continues to step 215.

In step 215, a command of a second configuration file is read and its hierarchical modality is determined. The second configuration file could be, for example, a startup configuration file or an earlier running configuration file for the network device. In step 220, it is determined whether the hierarchical modality of the first command is the same as the hierarchical modality of the second command. According to some aspects of method 200, the number of spaces preceding the first command is compared to the number of spaces preceding the second command in order to determine the hierarchical modality. If the number of spaces is the same, the second command is determined to be at the same level in the command hierarchy, e.g., at the same submode level. If so, the method optionally proceeds to step 225, wherein it is determined whether the second command is actually in the same submode as the first command. If not, the process proceeds to step 240, the second command is skipped, and another command is read from the second configuration file.

In step 230, it is determined whether the first command matches the second command. If the commands do not match, it is determined whether the entire second configuration file has been searched. If so, the command is stored in an ICD file in step 265. If not, the process returns to step 215 and another command is read from the second configuration file.

If the commands match, it is determined in step 235 whether the first command is in the same relative position with respect to commands of the same type as the first command in the first configuration file as compared to the position of the second command in the second configuration file. If not, the process returns to step 215. If so, it is determined in step 250 whether the re-ordering is significant. If so, the command is stored in an ICD file. If not, the method seeks to read the next line of the first configuration file in step 255. If all of the commands of the first configuration file have already been read, the process ends. If all of the commands of the first configuration file have not already been read, the process returns to step 110 and the next command of the first configuration file is written in the context array. The process continues until all commands of the first configuration file have been evaluated.

Figure 3:
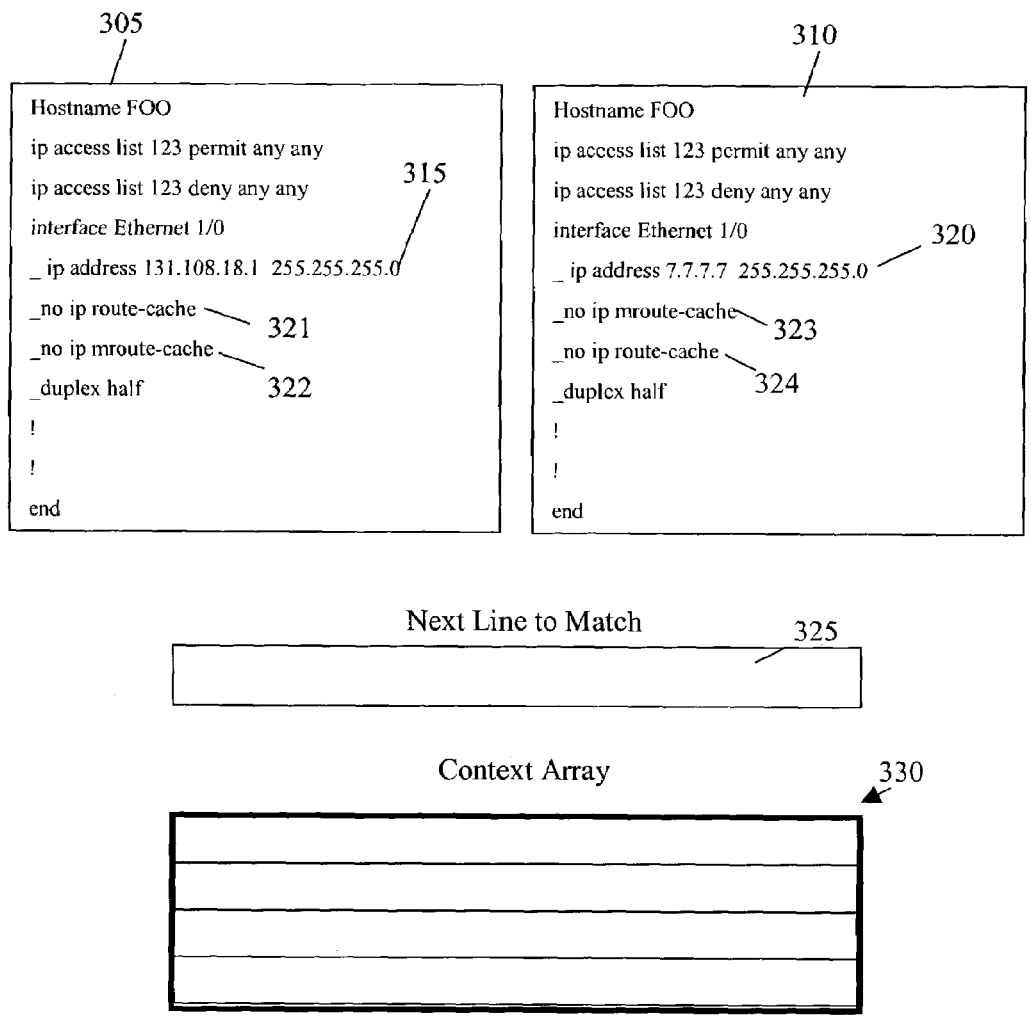
FIG. 3 illustrates two exemplary configuration files.

Some aspects of the present invention will be described in further detail with reference to FIGS. 3 through 13. FIG. 3 illustrates simplified configuration files 305 and 310, which will be compared according to one aspect of the present invention. In this example, file 305 is a modified file and file 310 is an original file. In this example, files 305 and 310 contain identical commands, except that line 315 of file 305 does not match line 320 of file 310. However, lines 321 and 322 of file 305 are in a different sequence as compared to corresponding lines 323 and 324 of file 310. According to some aspects of the invention, file 310 is a startup configuration file, which specifies an initial configuration state of a router and file 305 is a running configuration file, which indicates a current configuration state of a router.

In one phase of this method, a computer program searches configuration file 310 and attempts to find a copy of each command from configuration file 310 within configuration file 305. The result of this phase, sometimes referred to as a "negative pass," is to identify commands that exist in file 305 but that do not exist in file 310. When file 310 is an initial configuration state and file 305 is a running configuration file, a negative pass identifies commands that have been added since the original configuration state. These commands would, therefore, need to be deleted from the running configuration file in order to return a router to the original configuration state.

In another phase of this method, a computer program searches configuration file 305 and attempts to find a copy of each command in configuration file 310. The result of this phase, sometimes referred to as a "positive pass," is to identify commands that exist in file 310 but that do not exist in file 305. For example, a positive pass identifies commands that have been deleted from the original configuration state. These commands would need to be added to a running configuration state in order to return a router to the original configuration state.

Performing a negative pass or a positive pass alone will provide the necessary output for some applications, but other applications (e.g., "rollback" to a previous configuration state) require output from a negative and a positive pass. According to some such embodiments, the negative pass is performed before the positive pass.

The method according to this aspect of the invention does not attempt to match lines of a configuration file that are not command lines. For example, comment lines (which begin with an exclamation point) are skipped. According to other aspects of the invention each line may be evaluated, but skipping lines that are not command lines is more efficient.

First, a negative pass will be described with reference to FIGS. 3 through 12. Field 325 is a variable that indicates the "next line to match." For a negative pass, the next line to match is a command in file 305 for which the program is currently attempting to find a match in file 310. Context array 330 will indicate the context within which a particular command has been found, as discussed in detail in the following paragraphs. Field 325 and context array 330 are stored in memory, e.g., in memory buffers.

Figure 4:
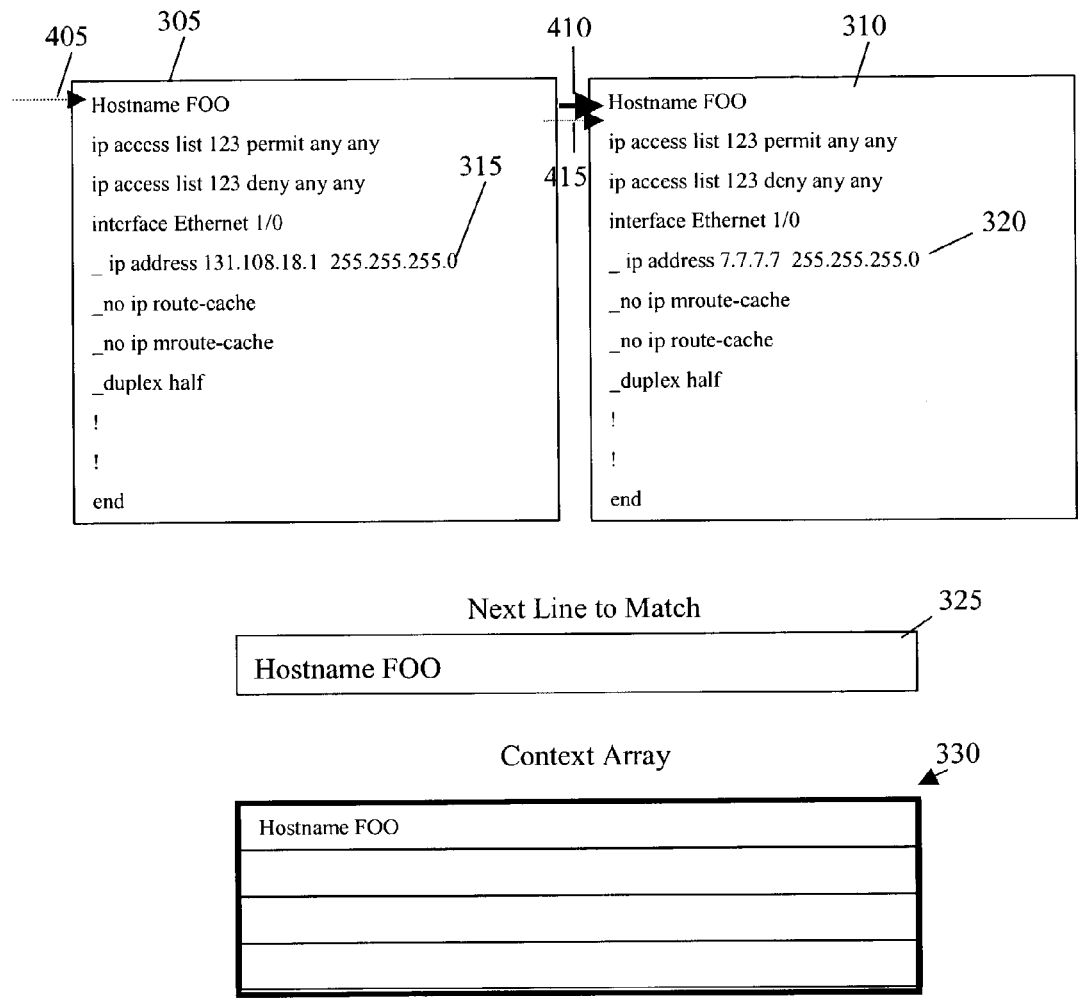
FIG. 4 illustrates two exemplary configuration files and a context array at a first time during a comparison of a first configuration file to a second configuration file.

FIG. 4 illustrates the first steps of a negative pass according to some aspects of this method. Here, the first command line of file 305, "Hostname FOO," is written in field 325. Pointer 405 indicates the line of file 305 (in this instance, "Hostname FOO"), for which a match is currently sought. Pointer 405 is retained in a memory, such as a buffer memory. In some embodiments, pointer 405 is retained in memory associated with field 325, in other embodiments with context array 330 and in yet other embodiments in memory associated with both field 325 and context array 330. Because "Hostname FOO" has no preceding spaces, it is determined to be either a top-level submode or a top-level command. Therefore, "Hostname FOO" is written in line 335 of context array 330.

The line in field 325 is then compared to the first line of file 310. Because the first line of file 310 is a command line, it is evaluated to determine whether it matches with the line of field 325. In this case, the first line of file 310 matches the line in field 325. "Hostname FOO" will be retained, for the time being, in line 335 of context array 330 because it may be the context name of the next command line.

Pointer 410 indicates the position of the last line in file 310 which matched, so pointer 410 is initially positioned just after the first line of file 310. According to other aspects of this method, pointer 410 is positioned adjacent to the last line of file 310 that matched. However, positioning pointer 410 just after the last line that matched is preferred, because this pointer indicates where in file 310 the method should continue looking for a match. In some preferred embodiments, one or more additional pointers are positioned to track where a search last took place in the previous submode level. That way, when a search is completed in a particular submode, there is an indication of where the last match occurred (or a last command was evaluated) in a parent submode level. Pointer 415 indicates the first command of the current submode level in file 310. The use of pointers 410 and 415 will be clarified in the following paragraphs. In some embodiments, pointers are retained in memory associated with field 325. In other embodiments, pointers are retained in memory associated with context array 330 and in yet other embodiments in memory associated with both field 325 and context array 330.

Figure 5:
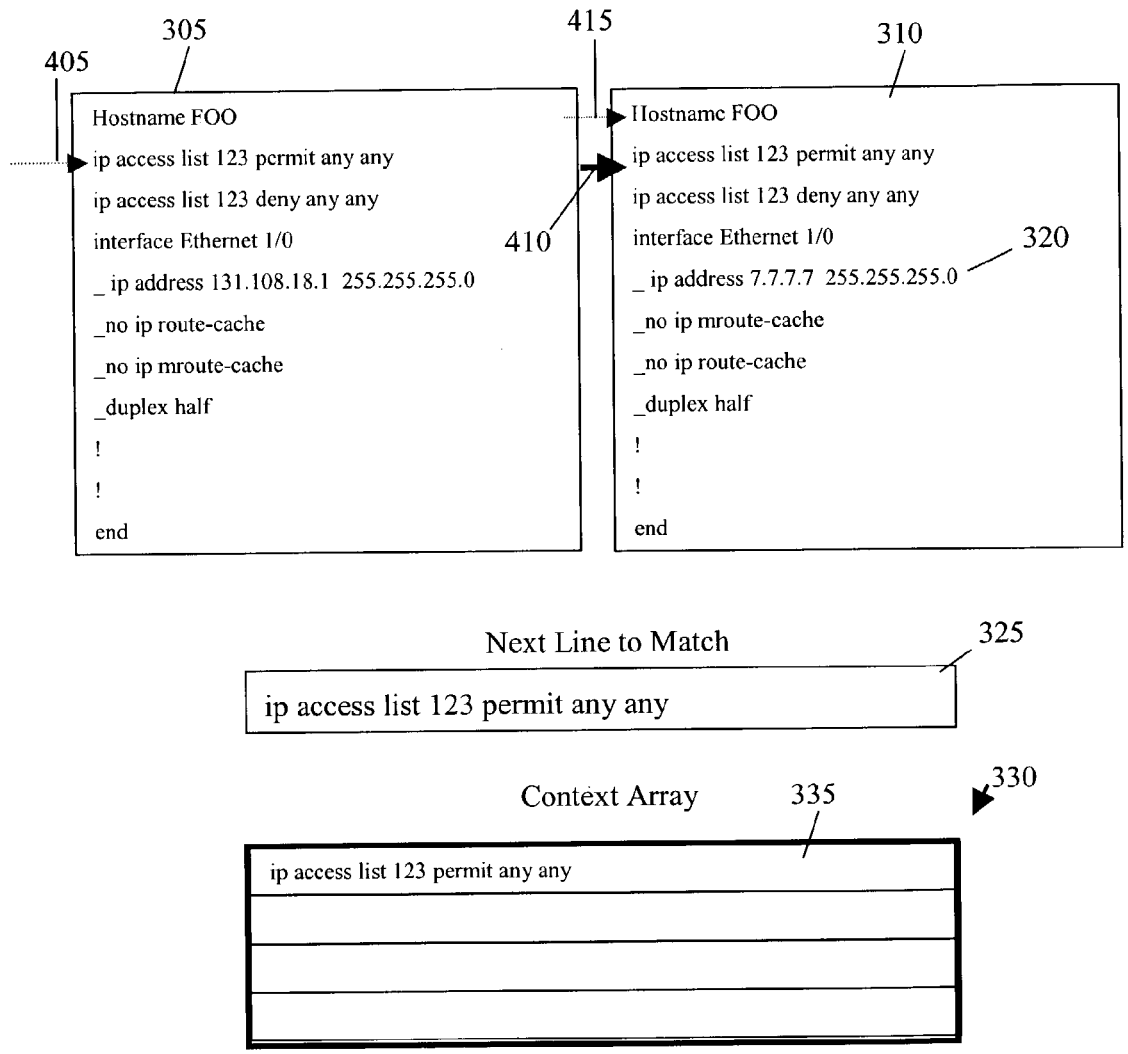
FIG. 5 illustrates two exemplary configuration files and a context array at a second time during a comparison of a first configuration file to a second configuration file.

After the first line of file 310 has been evaluated, pointer 410 is positioned below "Hostname FOO," as shown in FIG. 5. Lines above pointer 410 will not be evaluated (at least initially) to find a match with subsequent lines written in field 325. Accordingly, the use of pointers 410 and 415 decreases the number of lines in file 310 which must be evaluated, thereby allowing a more efficient operation of this method.

When the next command line of file 305 is evaluated, pointer 405 is moved down one line and this line ("ip access list 123 permit any any") is written in field 325, because it is a command line. Because "ip access list 123 permit any any" has no preceding spaces, it is also determined to be a top-level submode. Therefore, "ip access list 123 permit any any" is written in line 335 of context array 330. The next line below "Hostname FOO" in file 310 is evaluated to see if it matches the line in field 325. Because it matches, "ip access list 123 permit any any" remains in line 335 pending evaluation of the next line in file 305.

Figure 6:
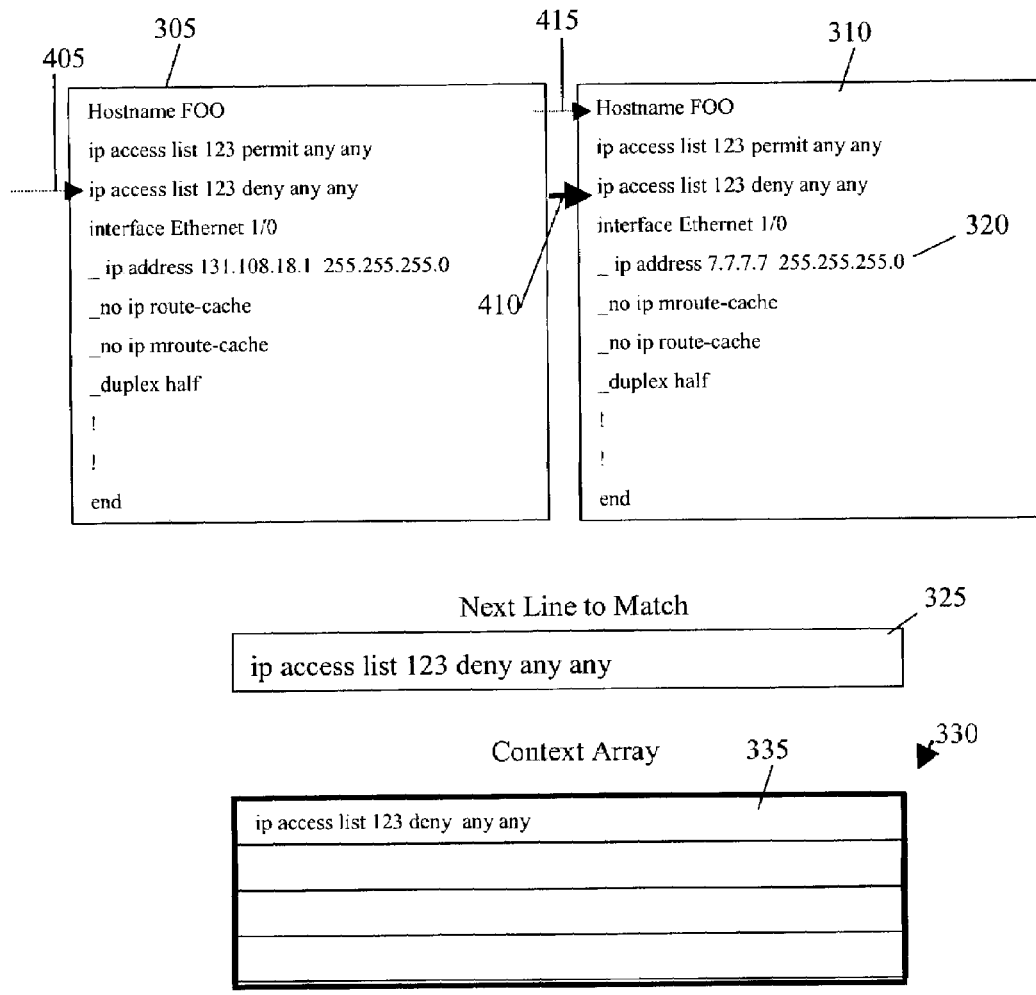
FIG. 6 illustrates two exemplary configuration files and a context array at a third time during a comparison of a first configuration file to a second configuration file.

Pointer 410 is moved to a position below "ip access list 123 permit any any" in file 310, as shown in FIG. 6. Pointer 405 is moved down one line and this line ("ip access list 123 deny any any") is evaluated to determine whether it is a command line and whether it includes an initial space. Because "ip access list 123 deny any any" is a command line, it is written in field 325. Because "ip access list 123 deny any any" contains the same number of initial spaces (i.e. zero spaces) as the last command in the context array, "ip access list 123 deny any any" is written in line 335. File 310 is searched, starting below pointer 410, to find a match for "ip access list 123 deny any any." The next line is a match, so "ip access list 123 deny any any" remains in line 335 pending evaluation of the next line in file 305.

Figure 7:
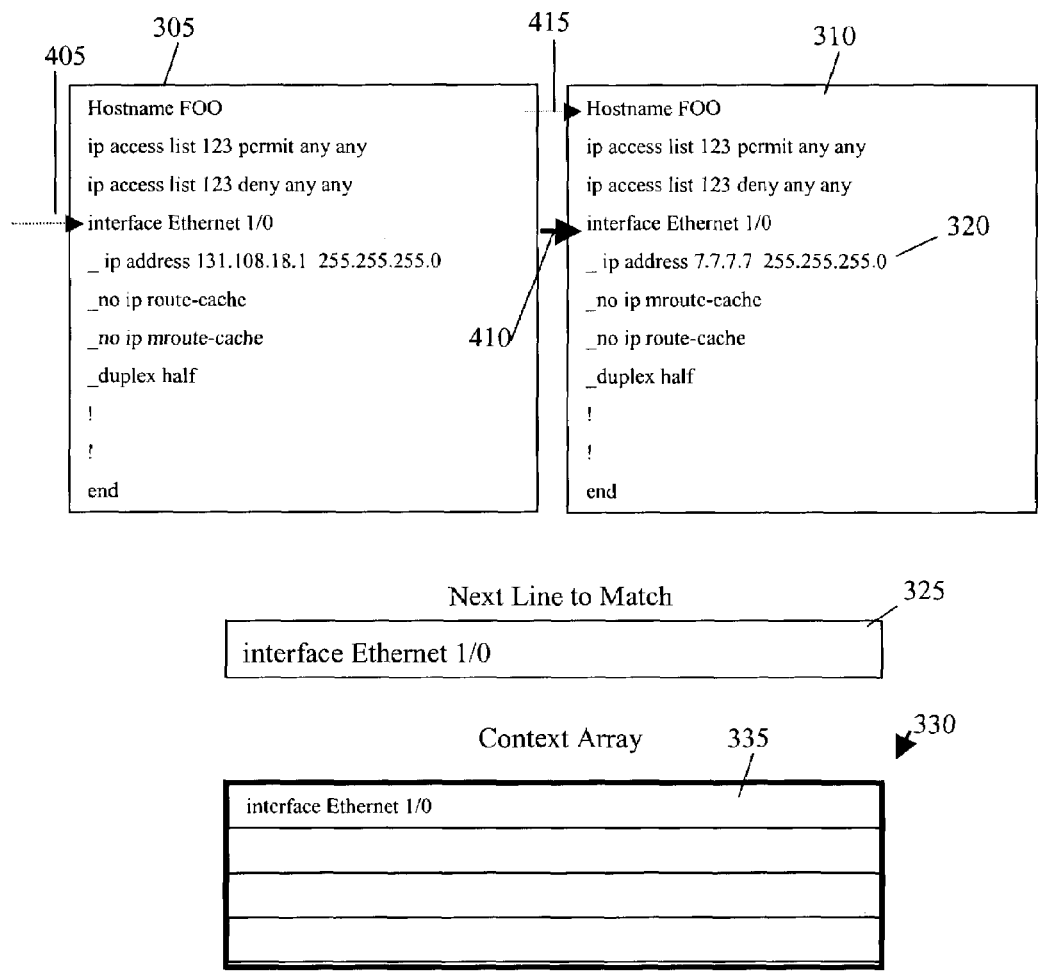
FIG. 7 illustrates two exemplary configuration files and a context array at a third time during a comparison of a first configuration file to a second configuration file.

Pointer 410 is moved to a position just below "ip access list 123 deny any any" in file 310, as shown in FIG. 7. Pointer 405 is moved down one line and this line ("interface Ethernet 1/0") is evaluated to determine whether it is a command line and whether it includes an initial space. Because "interface Ethernet 1/0" is a command line, it is written in field 325. Because "interface Ethernet 1/0" contains the same number of initial spaces (i.e. zero spaces) as the last command in the context array, "interface Ethernet 1/0" is written in line 335. File 310 is searched, starting below pointer 410, to find a match for "interface Ethernet 1/0." The next line is a match, so "interface Ethernet 1/0" remains in line 335 pending evaluation of the next line in file 305.

Figure 8:
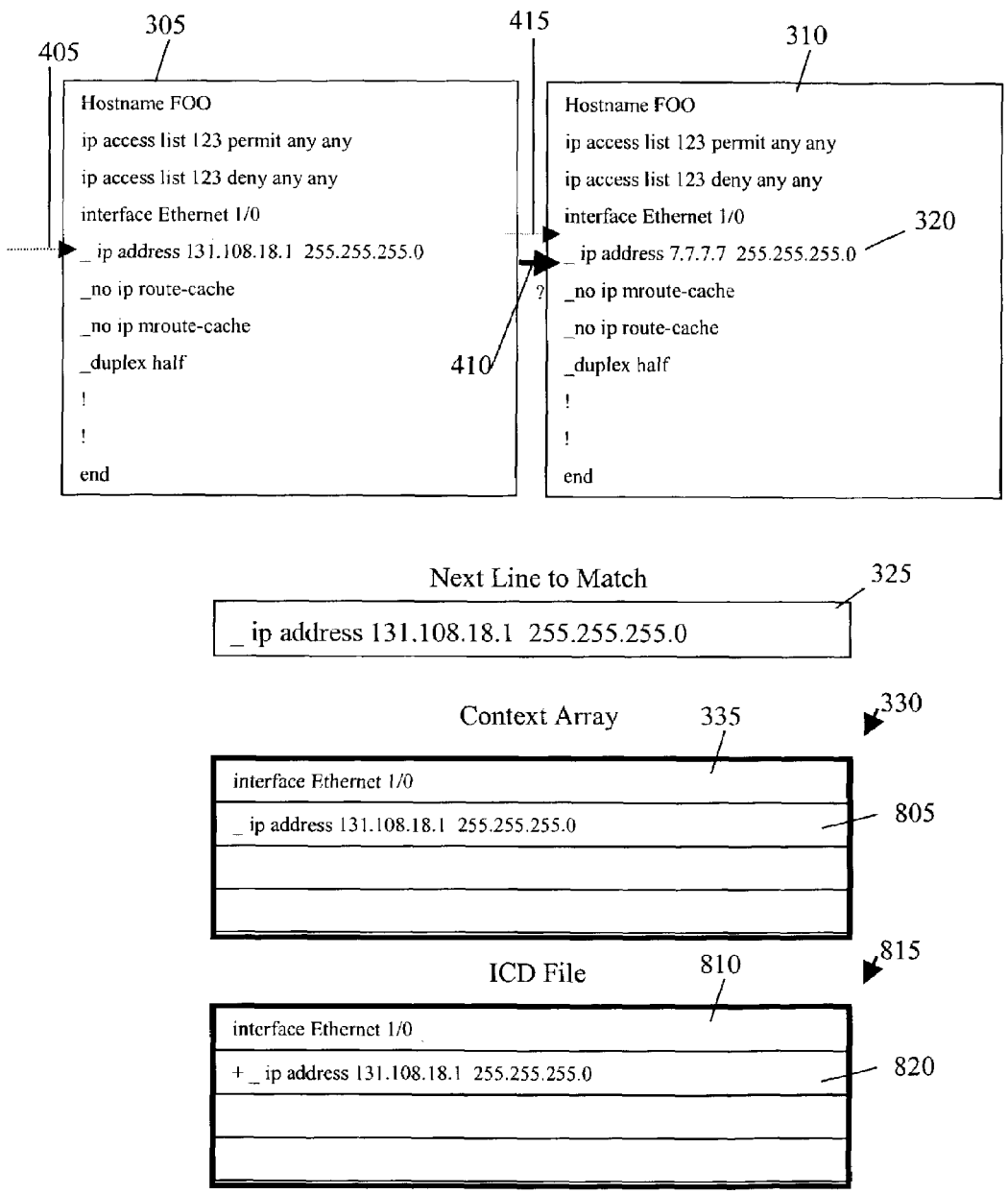
FIG. 8 illustrates two exemplary configuration files and a context array at a fifth time during a comparison of a second configuration file to a first configuration file.

Pointer 410 is moved to a position just below "interface Ethernet 1/0" in file 310, as shown in FIG. 8. Pointer 405 is moved down one line and this line ("_ip address 131.108.18.1, 255.255.255.0") is evaluated to determine whether it is a command line and whether it includes an initial space. Because "_ip address 131.108.18.1 255.255.255.0" is a command line, it is written in field 325. Because "_ip address 131.108.18.1 255.255.255.0" does include an initial space, "_ip address 131.108.18.1 255.255.255.0" is determined to be a command or submode within the submode "interface Ethernet 1/0." Therefore, "_ip address 131.108.18.1 255.255.255.0" is written in line 805 of context array 330, below "interface Ethernet 1/0."

In addition, pointer 415 is moved to indicate the beginning of commands within the new submode "interface Ethernet 1/0." However, the former position of pointer 415 is retained in memory, at least temporarily.

File 310 is searched, starting below pointers 410 and 415, to find a match for "_ip address 131.108.18.1, 255.255.255.0." However, in this case the next line of file 310 ("_ip address 7.7.7.7 255.255.255.0") is not a match. Therefore, successive lines of file 310 are queried as a match is sought, as indicated by the question mark to the left of "_no ip route-cache" in FIG. 8. As before, the first determination is whether each line is a command line. If a line is a command line, the next determination is whether the line has one initial space: if the line does not have an initial space, it is not in the same submode as "_ip address 131.108.18.1 255.255.255.0." Only after making these preliminary determinations is the line of file 310 compared to the current contents of field 325 (herein, "_ip address 131.108.18.1 255.255.255.0") to see if there is a match.

The lines "no ip mroute-cache," "no ip route-cache" and "duplex half" are investigated and it is determined that there is no match. The following lines of file 310 begin with an exclamation point, so these lines are skipped. The next line, "end," is a command line, but it does not have a preceding space. Therefore, it is determined that the "end" command is not within the same submode as the line currently stored in field 325. Accordingly, the algorithm returns to pointer 415, which marks the beginning of this submode, and determines whether all lines of this submode have been investigated to search for a match.

Since there is no match in the submode, "_ip address 131.108.18.1 255.255.255.0" is written in line 820 of intelligent configuration diff ("ICD") file 815. In order to preserve the hierarchical context of this command line, in preferred aspects of the invention, the corresponding top-level submode command "interface Ethernet 1/0" is written in line 810 of ICD file 815. According to some aspects of the invention, "_ip address 131.108.18.1 255.255.255.0" has a plus sign in line 810, indicating that this line is present in file 305 but missing from file 310. This sign may be introduced by the comparison algorithm, in a post-processing routine, or in any convenient way. Similarly, if a line is present in file 310 but is not in file 305 (as determined in a positive pass of this method, which will be explained below), the line will begin with a minus sign. However, other aspects of the invention use the opposite sign convention.

Figure 9:
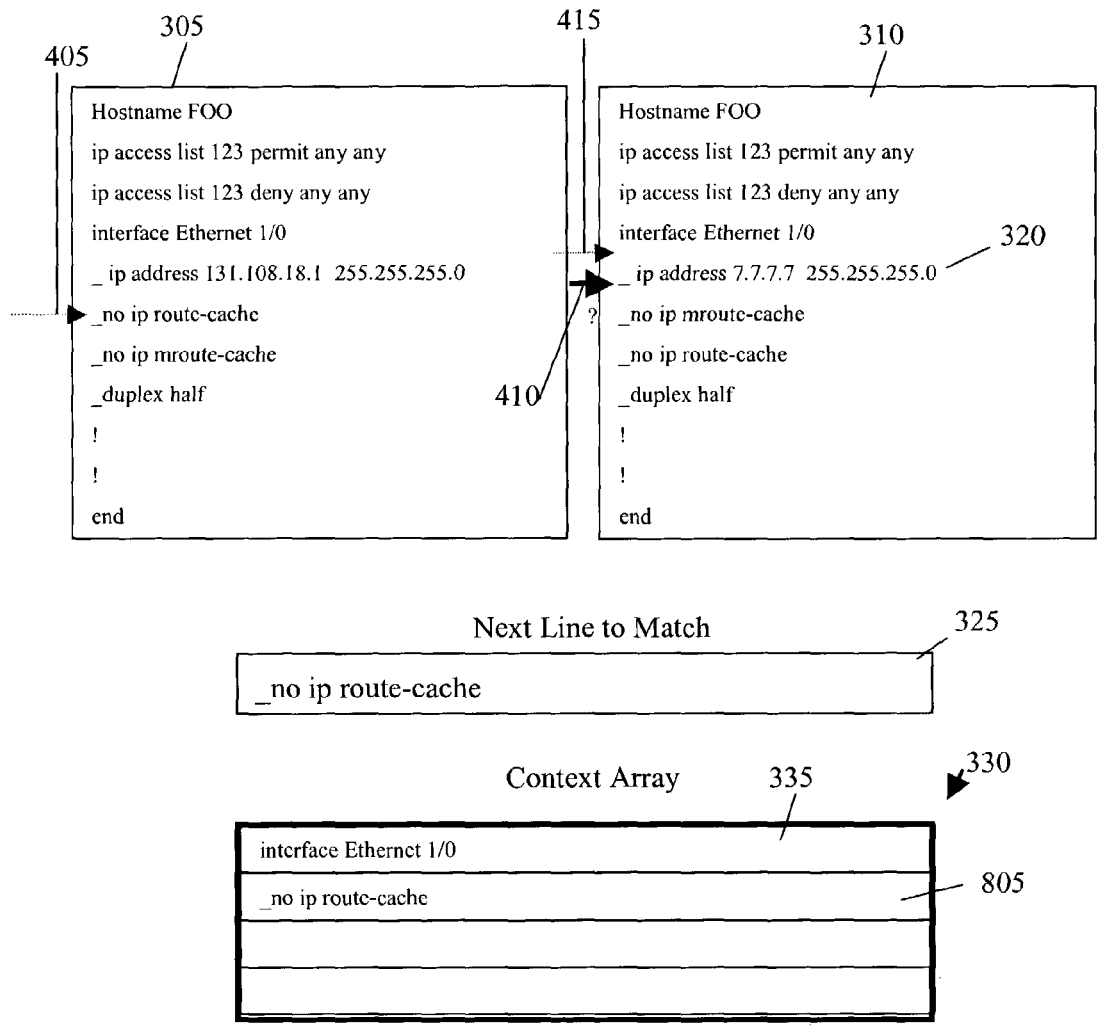
FIG. 9 illustrates two exemplary configuration files and a context array at a sixth time during a comparison of a second configuration file to a first configuration file.
Figure 10:
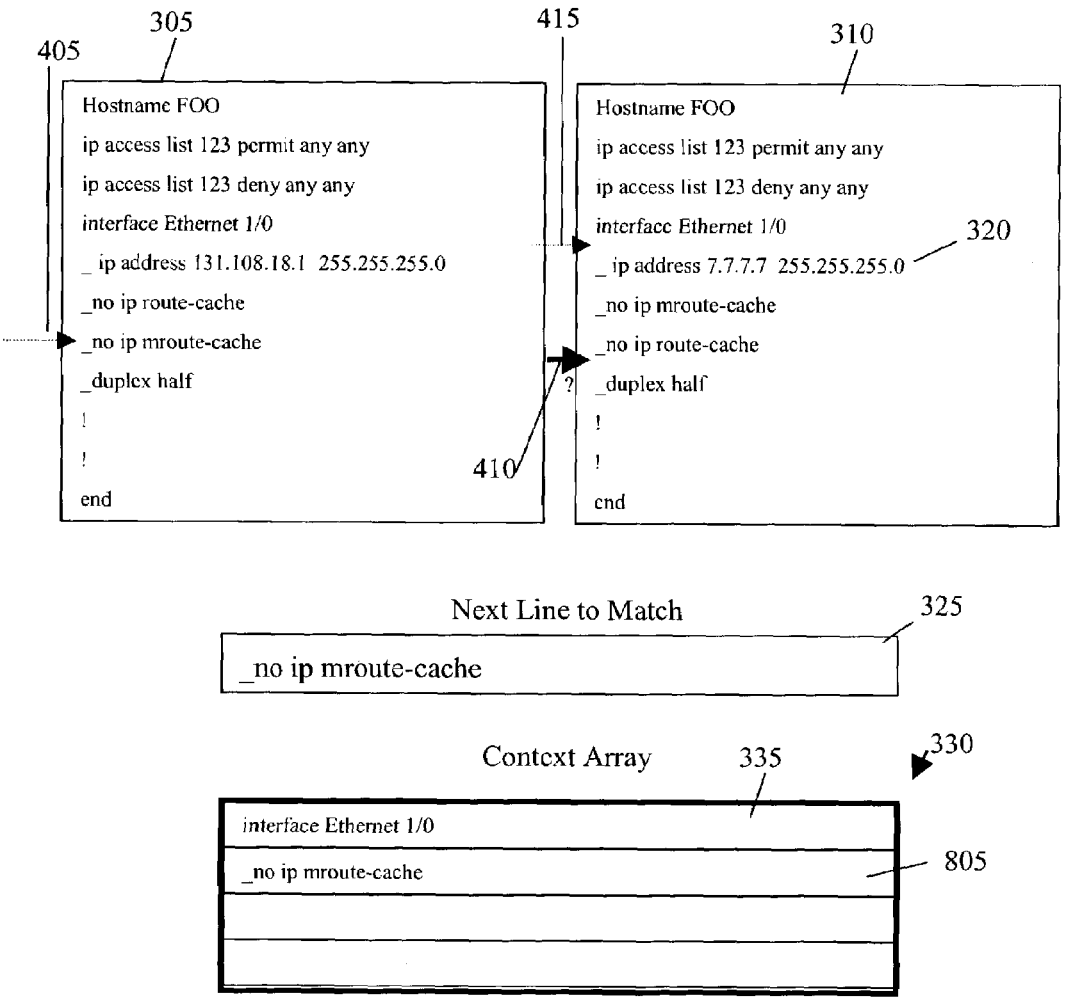
FIG. 10 illustrates two exemplary configuration files and a context array at a seventh time during a comparison of a second configuration file to a first configuration file.

The process then continues as before until all lines of file 305 are evaluated. As shown in FIG. 9, pointer 405 is advanced to the next line of file 305 and this line ("_no ip route-cache") is written into field 325 because it is a command line. Since "_no ip route-cache" includes a single space at the beginning of the line, it is determined to be at the same hierarchical level as "_ip address 131.108.18.1 255.255.255.0." Therefore, "_no ip route-cache" replaces "_ip address 131.108.18.1 255.255.255.0" in line 805 of context array 330.

File 310 is searched, starting below pointers 410 and 415, to find a match for "_no ip route-cache." Note that neither pointer moved during the search for the last entry in field 325: pointer 410 remained in the same position because there was no match and pointer 415 remained in the same position because the search is continuing in the same submode. Therefore, "_ip address 7.7.7.7 255.255.255.0" is evaluated first to determine whether it matches with "_no ip route-cache." It does not match, so the next line of file 310

("_no ip mroute-cache") is evaluated and determined not to match. The search proceeds to the next line of file 310, where a match is found. Pointer 410 advances to the line of 310 where a match is found (or alternatively, to a position just after the line where the match is found).

However, the line number of pointer 405 (line 6 of file 305) is different from the line number where the match is found (line 7 of file 310). In preferred aspects of the present invention, when a match is found in a part of the configuration file 310 that is above pointer 410, this difference is stored in a memory. (Comment lines and other non-command lines are not included in this determination.) This memory may be a memory associated with context array 330 or ICD file 815, or may be another memory location. According to some such aspects, if the same command occurs in a part of the configuration file 310 that is above pointer 410, it is determined whether re-ordering the command is significant. For example, a look-up table of order-sensitive commands (such as access control list commands) may be referenced to determine whether the command is in the table. If so, this fact is retained in memory. In some such aspects, the memory is associated with ICD file 815. If the command is not order-sensitive, the method proceeds, generally speaking, as if an ordinary match had been obtained. One exception will be explained in the following example.

In this instance the command is not order-sensitive, so the process continues as if a normal match had been found. As may be seen in FIG. 10, pointer 405 advances to the next line of file 305, which is "_no ip mroute-cache." Field 325 and line 805 of context array 330 are updated to read "_no ip route-cache." Pointer 410 moves to a position just past where the last match was found in file 310 and the search for "_no ip mroute-cache" begins at "_duplex half," the next line after pointer 410. This is not a match, so the search proceeds to the next line of file 310, which is skipped because it is a comment line. The next line is skipped for the same reason. The search continues to the last line of file 310, "end," which is not evaluated further because it lacks an initial space and therefore cannot be in the same submode as "_no ip mroute-cache."

Therefore, the search proceeds to "_ip address 7.7.7.7 255.255.255.0," the line just after pointer 415. This is not a match, so the search proceeds to the following line and a match is obtained. As with the previous match, however, the matching lines are in different positions of files 305 and 310. Therefore, "_no ip mroute-cache" is evaluated to determine whether it is an order-sensitive command. Because it is not an order-sensitive command, this is treated as an ordinary match, with one exception: according to some aspects of the invention, pointer 410 does not move because the matched line occurs prior to (above) the last matched line.

Figure 11:
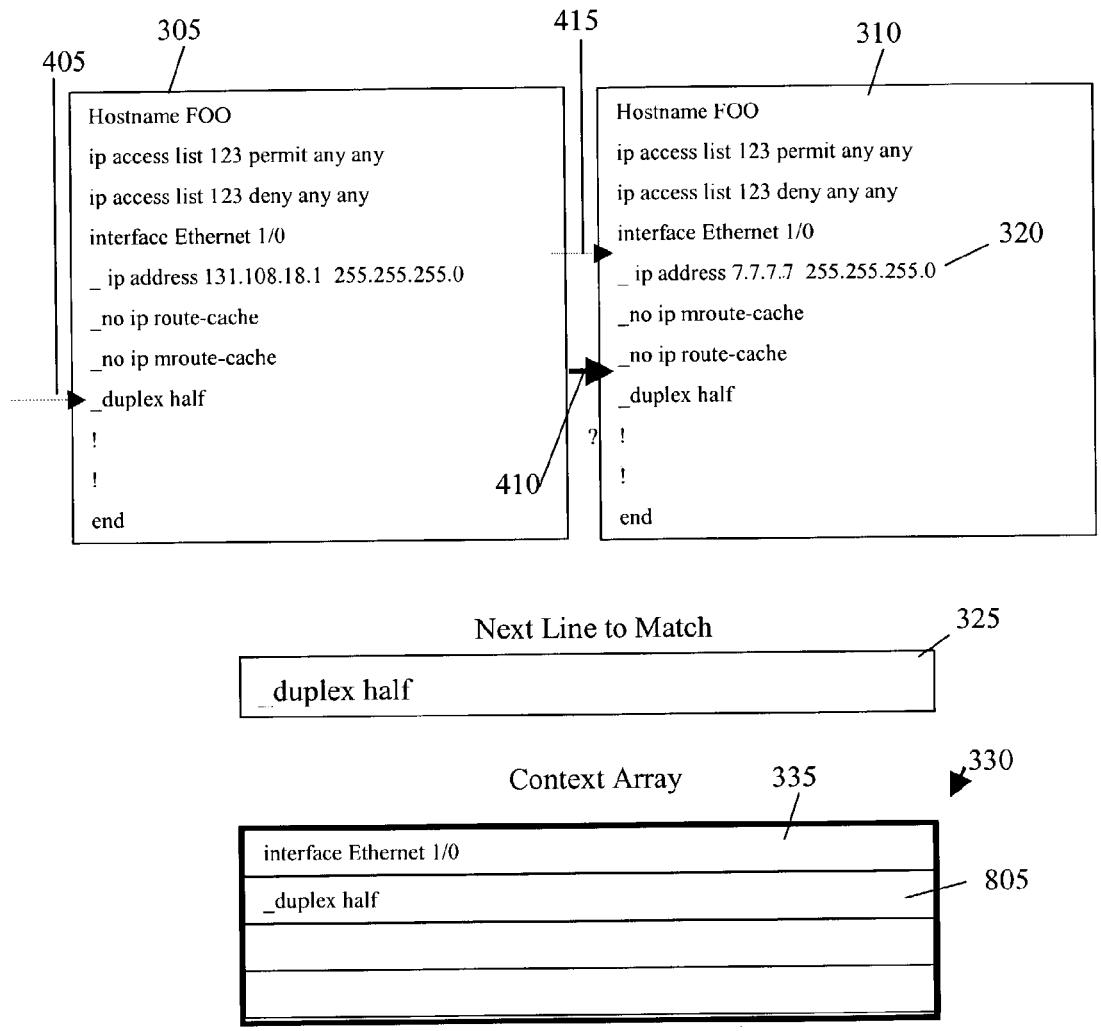
FIG. 11 illustrates two exemplary configuration files and a context array at a eighth time during a comparison of a second configuration file to a first configuration file.

As illustrated in FIG. 11, pointer 405 advances to the next line of file 305, which is "_duplex half." This is a bona fide command, so "_duplex half" is written in field 325. Because "_duplex half" includes an initial space, it is also written in line 805 of context array 330. The next phase of searching will begin with the line following pointer 410 in file 310, which is a match.

Pointer 405 then advances to the next line of file 305, which is skipped because it is a comment line. Pointer 405 advances to the following line of file 305, which is skipped for the same reason.

Figure 12:
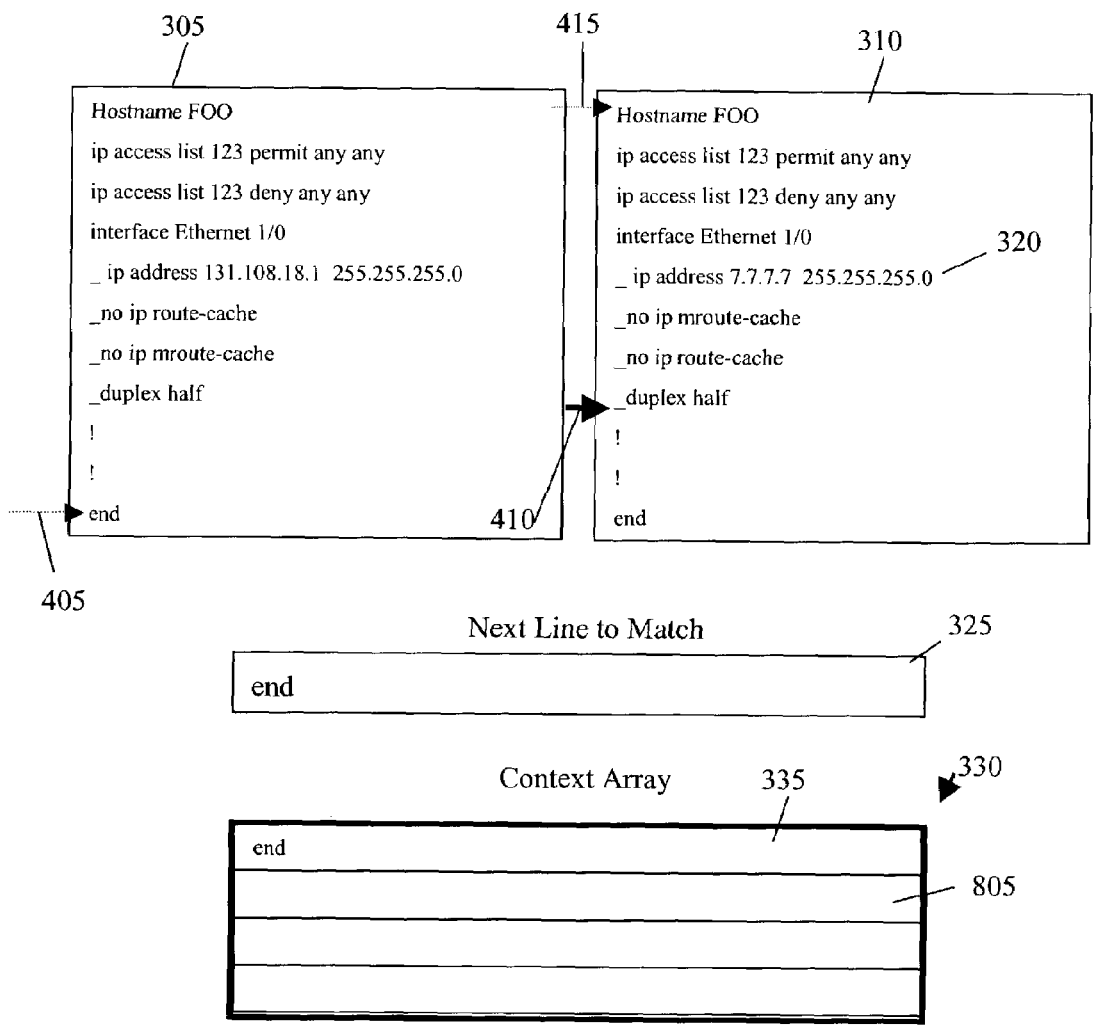
FIG. 12 illustrates two exemplary configuration files and a context array at a ninth time during a comparison of a second configuration file to a first configuration file.

As shown in FIG. 12, pointer 405 then goes to the next line of file 305, "end." This is a bona fide command, so "end" is written in field 325. Because "end" does not include an initial space, "end" is not at the same submode level as the preceding commands of file 305. Accordingly, line 805 of context array 330 is cleared and "end" is written in line 335. In addition, pointer 415 moves to the beginning of file 310, because that is the location of the first command at the same submode level as the entry in field 325 (no preceding spaces).

The next phase of searching will begin with the first line of file 310 following pointer 410, which is skipped because it is a comment line. The next line is a comment line and is also skipped. The following line has the same number of preceding spaces (none) as the current entry of field 325, so it is evaluated to determine whether it is a match, which it is. Because there are no more entries of file 305 for which a match is sought, the negative pass ends. Depending on the process for which the foregoing method is performed, the contents of ICD file 815 (and any other relevant data) may be output at this time.

According to preferred embodiments of the invention wherein a copy of pointer 410 is retained for every submode and for the top level, the search for a match to the "end" command of file 105 would be slightly different. The pointer for the submode "interface Ethernet 1/0" would be deleted and replaced with the saved pointer for the top level. This pointer points to the line following "interface Ethernet 1/0" because that was the last successful match at the top level. The subroutine is trying to match "end" which has zero preceding spaces, so lines in the submode "interface Ethernet1/0" that have preceding spaces are skipped. Comment lines are also skipped. Finally, the process reaches a line at the top level that we can compare: this is the command "end" in file 310, which is a match.

In a "positive" pass, each command line of file 310, in turn, is compared to the commands of file 305, in the manner described above. The command of file 310 for which a match is currently sought is indicated by pointer 405 and entered in field 325. Pointers 410 and 415 are used as described above, except that these pointers are used in file 305 instead of file 310. As noted above, the positive pass identifies those commands which are in file 310 but are not in file 305.

As previously discussed, "_ip address 7.7.7.7 255.255.255.0" is in file 310 but is not in file 305. Therefore, the result of a positive pass with the foregoing exemplary files 305 and 310 is that ICD file 815 will have "−_ip address 7.7.7.7 255.255.255.0" in one of lines 820. Line 810 indicates that the context of line 815 is top-level command "interface Ethernet 1/0." In this example, the contents of ICD file 815 are output after the negative and positive passes are complete.

Figure 13:
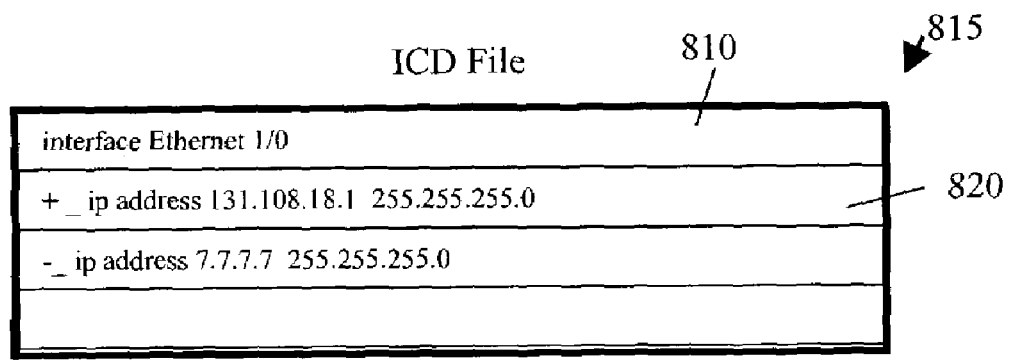
FIG. 13 depicts an exemplary output resulting from the foregoing comparisons.

FIG. 13 depicts the contents of ICD file 815 at this time. However, the format of ICD file 815 shown in FIG. 13 is merely illustrative; numerous other formats are within the scope of the present invention. For example, according to other aspects of the invention, ICD file 815 has the following format:
Interface Ethernet 1/0
+_ip address 131.108.18.1 255.255.255.0
Interface Ethernet 1/0
−_ip address 7.7.7.7 255.255.255.0

The foregoing process results in an output which is in a "programmatic" format, meaning that ICD file 815 may be used as an input file to a program for changing configuration states. For example, ICD file 815 may be used as input to a "rollback" operation, wherein a device's configuration state at a second time is returned to the device's previous configuration state at a first time. In a rollback operation, commands of the second configuration state that have been added since the first time ("added commands") must be deleted. Moreover, commands of the first configuration state that have been deleted by the second time ("deleted commands" or "missing commands") must be added. In preferred aspects of the invention, added commands are deleted before deleted commands are added. According to some aspects of the invention, the diffing and rollback operations are performed as one continuous process, with the output of an automated diffing operation being input to an automated rollback operation.

Generally, the methods of the present invention may be implemented on software and/or hardware. For example, the invention can be implemented in an operating system kernel, in a separate user process, in a library package bound into network applications, on a specially constructed machine, or on a network interface card. In a specific embodiment of this invention, the technique of the present invention may be implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the methods of this invention may be implemented in specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 14:
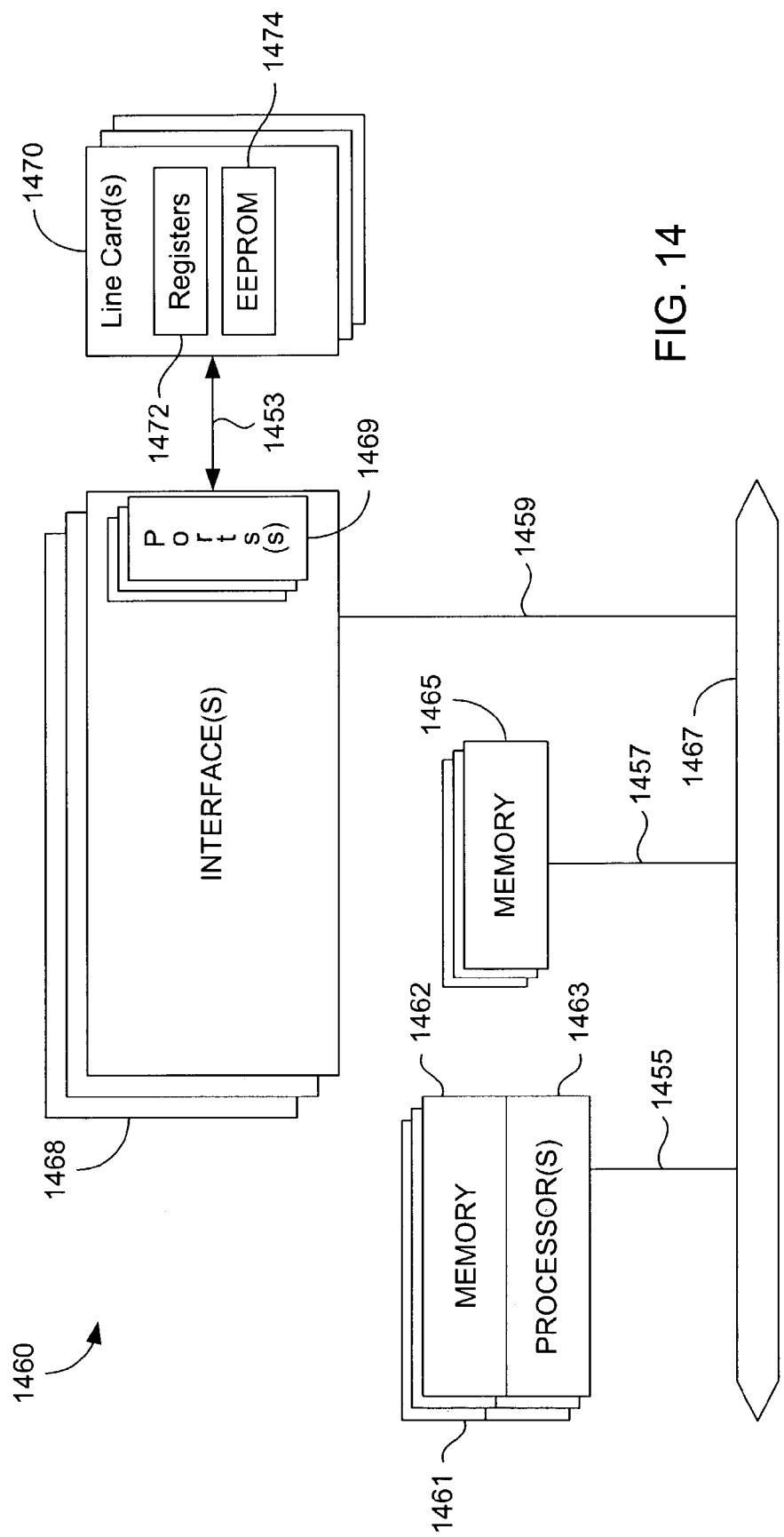
FIG. 14 illustrates a network device for implementing some aspects of the invention.

Referring now to FIG. 14, a network device 1460 suitable for implementing the techniques of the present invention includes a master central processing unit (CPU) 1462, interfaces 1468, and a bus 1467 (e.g., a PCI bus). When acting under the control of appropriate software or firmware, the CPU 1462 may be responsible for implementing specific functions associated with the functions of a desired network device. For example, when configured as an intermediate router, the CPU 1462 may be responsible for analyzing packets, encapsulating packets, and forwarding packets for transmission to a set-top box. The CPU 1462 preferably accomplishes all these functions under the control of software including an operating system (e.g. Windows NT), and any appropriate applications software.

CPU 1462 may include one or more processors 1463 such as a processor from the Motorola family of microprocessors or the MIPS family of microprocessors. In an alternative embodiment, processor 1463 is specially designed hardware for controlling the operations of network device 1460. In a specific embodiment, a memory 1461 (such as non-volatile RAM and/or ROM) also forms part of CPU 1462. However, there are many different ways in which memory could be coupled to the system. Memory block 1461 may be used for a variety of purposes such as, for example, caching and/or storing data, programming instructions, etc.

The interfaces 1468 are typically provided as interface cards (sometimes referred to as "line cards"). Generally, they control the sending and receiving of data packets over the network and sometimes support other peripherals used with the network device 1460. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1462 to efficiently perform routing computations, network diagnostics, security functions, etc.

Although the system shown in FIG. 14 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1465) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. It will be appreciated that, according to specific embodiments, at least a portion of functions described herein that are performed by a network device such as a router, a switch and/or selected components thereof, may be implemented in another device. For example, these functions could be performed by a host device (e.g., a personal computer or workstation). Such a host could be operated, for example, by a network administrator. Therefore, the scope of the invention should be determined with reference to the appended claims.

We claim:

1. A method of comparing a first configuration file having first commands and a second configuration file having second commands, comprising:
   determining first hierarchical levels of the first commands;
   searching only second hierarchical levels in the second configuration file for second commands that match the first commands, wherein the second hierarchical levels correspond to the first hierarchical levels;
   saving a first missing command for which no match is found in the searching step;
   saving context information for the first missing command;
   identifying a first re-ordered command that matches a second command, wherein the first re-ordered command has a first position in the first configuration file, wherein the second command has a second position in the second configuration file, and wherein the first position is different from the second position;
   determining whether the first re-ordered command is order-sensitive; and,
   if the first re-ordered command is order-sensitive, storing the first re-ordered command.

2. The method of claim 1, wherein the determining step comprises determining a number of spaces preceding a first command.

3. The method of claim 1, wherein the first configuration file is a startup configuration file.

4. The method of claim 1, wherein the first configuration file is a running configuration file.

5. The method of claim 1, wherein the searching step comprises determining a number of spaces preceding a second command.

6. The method of claim 1, wherein the searching step comprises beginning a search after a position of a second command that matched a first command.

7. The method of claim 1, wherein the context information comprises a command at a higher hierarchical level than the first missing command.

8. The method of claim 1, further comprising:
   determining second hierarchical levels of second commands in the second configuration file;
   searching only first hierarchical levels in the first configuration file for first commands that match the second commands, wherein the first hierarchical levels correspond to the second hierarchical levels;
   saving a second missing command for which no match is found in the searching step; and
   saving context information for the second missing command.

9. A computer program stored in a computer-readable medium that includes instructions for causing a computer to compare a first configuration file having first commands and a second configuration file having second commands by performing the following actions:
   determining first hierarchical levels of the first commands;
   searching only second hierarchical levels in the second configuration file for second commands that match the first commands, wherein the second hierarchical levels correspond to the first hierarchical levels;
   saving a first missing command for which no match is found in the searching step;
   saving context information for the first missing command;
   identifying a first re-ordered command that matches a second command, wherein the first re-ordered command has a first position in the first configuration file, wherein the second command has a second position in the second configuration file, and wherein the first position is different from the second position;
   determining whether the first re-ordered command is order-sensitive; and,
   if the first re-ordered command is order-sensitive, storing the first re-ordered command.

10. The computer program of claim 9, wherein the determining step comprises determining a number of spaces preceding a first command.

11. The computer program of claim 9, wherein the first configuration file is a startup configuration file.

12. The computer program of claim 9, wherein the first configuration file is a running configuration file.

13. The computer program of claim 9, wherein the searching step comprises determining a number of spaces preceding a second command.

14. The computer program of claim 9, wherein the searching step comprises beginning a search after a position of a second command that matched a first command.

15. The computer program of claim 9, wherein the context information comprises a command at a higher hierarchical level than the first missing command.

16. The computer program of claim 9, further comprising:
   instructions for causing the computer to perform the following actions:
      determining second hierarchical levels of second commands in the second configuration file;
      searching only first hierarchical levels in the first configuration file for first commands that match the second commands, wherein the first hierarchical levels correspond to the second hierarchical levels;
      saving a second missing command for which no match is found in the searching step; and
      saving context information for the second missing command.

17. A network device for comparing a first configuration file having first commands and a second configuration file having second commands, wherein the network device is configured to perform the following actions:
   determine first hierarchical levels of first commands in the first configuration file;
   search only second hierarchical levels in the second configuration file for second commands that match the first commands, wherein the second hierarchical levels correspond to the first hierarchical levels;
   save a first missing command for which no match is found in the searching step;
   save context information for the first missing command;
   identify a first re-ordered command that matches a second command, wherein the first re-ordered command has a first position in the first configuration file, wherein the second command has a second position in the second configuration file, and wherein the first position is different from the second position;
   determine whether the first re-ordered command is order-sensitive; and
   if the first re-ordered command is order-sensitive, store the first re-ordered command.

18. The network device of claim 17, wherein the determining step comprises determining a number of spaces preceding a first command.

19. The network device of claim 17, wherein the first configuration file is a startup configuration file.

20. The network device of claim 17, wherein the first configuration file is a running configuration file.

21. The network device of claim 17, wherein the searching step comprises determining a number of spaces preceding a second command.

22. The network device of claim 17, wherein the searching step comprises beginning a search after a position of a second command that matched a first command.

23. The network device of claim 17, wherein the context information comprises a command at a higher hierarchical level than the first missing command.

24. The network device of claim 17, wherein the network device is further configured to:
   determine second hierarchical levels of second commands in the second configuration file;
   search only first hierarchical levels in the first configuration file for first commands that match the second commands, wherein the first hierarchical levels correspond to the second hierarchical levels;
   save a second missing command for which no match is found in the searching step; and
   save context information for the second missing command.

25. A network device for comparing a first configuration file having first commands and a second configuration file having second commands, the network device comprising:
   means for determining first hierarchical levels of the first commands;
   means for searching only second hierarchical levels in the second configuration file for second commands that match the first commands, wherein the second hierarchical levels correspond to the first hierarchical levels;
   means for saving a first missing command for which no match is found in the searching step; and
   means for saving context information for the first missing command;
   means for identifying a first re-ordered command that matches a second command wherein the first re-ordered command has a first position in the first configuration file, wherein the second command has a second position in the second configuration file, and wherein the first position is different from the second position;
   means for determining whether the first re-ordered command is order-sensitive; and,
   if the first re-ordered command is order-sensitive,
      means for storing the first re-ordered command.

26. The network device of claim 25, wherein the means for determining comprises means for determining a number of spaces preceding a first command.

27. The network device of claim 25, wherein the first configuration file is a startup configuration file.

28. The network device of claim 25, wherein the first configuration file is a running configuration file.

29. The network device of claim 25, wherein the means for searching comprises means for determining a number of spaces preceding a second command.

30. The network device of claim 25, wherein the means for searching comprises beginning a search after a position of a second command that matched a first command.

31. The network device of claim 25, wherein the context information comprises a command at a higher hierarchical level than the first missing command.

32. The network device of claim 25, wherein the network device further comprises:
   means for determining second hierarchical levels of second commands in the second configuration file;
   means for searching only first hierarchical levels in the first configuration file for first commands that match the second commands, wherein the first hierarchical levels correspond to the second hierarchical levels;
   means for saving a second missing command for which no match is found in the searching step; and
   means for saving context information for the second missing command.

* * * * *